US007489696B2

(12) United States Patent
Longoni et al.

(10) Patent No.: US 7,489,696 B2
(45) Date of Patent: Feb. 10, 2009

(54) METHOD AND SYSTEM FOR IMPLEMENTING A SIGNALLING CONNECTION IN A DISTRIBUTED RADIO ACCESS NETWORK

(75) Inventors: Fabio Longoni, Malaga (ES); Tuomas Niemelä, Helsinki (FI)

(73) Assignee: Nokia Corporation, Espoo (FI)

( * ) Notice: Subject to any disclaimer, the term of this patent is extended or adjusted under 35 U.S.C. 154(b) by 870 days.

(21) Appl. No.: 10/690,533

(22) Filed: Oct. 23, 2003

(65) Prior Publication Data

US 2004/0082366 A1 Apr. 29, 2004

Related U.S. Application Data

(63) Continuation of application No. PCT/FI01/00391, filed on Apr. 23, 2001.

(51) Int. Cl.
*H04L 12/28* (2006.01)
(52) U.S. Cl. .................. 370/401; 370/389; 370/328; 370/465; 370/466; 370/469
(58) Field of Classification Search ......... 370/254–256, 370/310, 312, 328, 336, 345, 347, 389, 400, 370/401, 408, 410, 464, 465–467, 469, 498, 370/522, 524
See application file for complete search history.

(56) References Cited

U.S. PATENT DOCUMENTS 6,725,039 B1 * 4/2004 Parmar et al. ............... 455/436
6,795,437 B1 * 9/2004 Rasanen et al. ............ 370/395.1
6,904,034 B2 * 6/2005 Kularatna et al. ............ 370/338
7,020,477 B2 * 3/2006 Cramby et al. .............. 455/458
7,072,358 B2 * 7/2006 Suvanen .................... 370/465
7,123,910 B2 * 10/2006 Lucidarme et al. .......... 455/434
7,197,311 B2 * 3/2007 Matusz ...................... 455/445
7,286,831 B2 * 10/2007 Rhee et al. ................. 455/453
7,382,750 B2 * 6/2008 Wu .......................... 370/331

FOREIGN PATENT DOCUMENTS

WO WO 01/13599 2/2001

OTHER PUBLICATIONS

"Wireless Interworking Architectures to Support Mobile IP over ATM", Jain et al, Applied Research Bellcore, IEEE, 1997, pp. 1866-1870.
"Architecture Alternatives for Wireless Data Services", Harasty et al, Bellcore, IEEE, 1994, pp. 310-314.

* cited by examiner

*Primary Examiner*—Wing F. Chan
*Assistant Examiner*—Mark A. Mais
(74) *Attorney, Agent, or Firm*—Squire, Sanders & Dempsey L.L.P.

(57) ABSTRACT

The objective of the present invention is to provide a virtual radio access network access server (RNAS) which is able to operate as an interworking unit between the base stations and other radio access elements as well as core network. Specifically, unlike according to the present scenario of the radio access network in which the functionalities of RNC and BSC have been implemented in the separate elements thus significantly increasing the number of network elements that has to be logically connected to the core network and/or to other radio access networks, the present invention is designed to reduce the amount of said elements.

26 Claims, 6 Drawing Sheets

METHOD AND SYSTEM FOR IMPLEMENTING A SIGNALLING CONNECTION IN A DISTRIBUTED RADIO ACCESS NETWORK

This is a Continuation of International Application No. PCT/FI01/00391 filed Apr. 23, 2001, which designated the U.S. and was published under PCT Article 21(2) in English.

FIELD OF THE INVENTION

The present invention relates to the telecommunication systems. In particular, the present invention relates to a novel and improved method and system for implementing a signalling bearer connection in a distributed radio access network.

BACKGROUND OF THE INVENTION

In the current specifications of the third generation mobile networks (referred to as UMTS), the system utilises the same well-known architecture that has been used by all main second generation systems. A block diagram of the system architecture of current UMTS network is presented in FIG. 1. The UMTS network architecture includes the core network (CN), the UMTS terrestrial radio access network (UTRAN), and the user equipment (UE). The core network is further connected to the external networks, i.e. Internet, PLMN, PSTN and/or ISDN.

The GSM Phase 1/2 Core Network consists of network switching subsystem (NSS). The NSS further consists of the following functional units: Mobile Switching Center (MSC), Visitor Location Register (VLR), Home Location Register (HLR), Authentication Center (AC) and equipment identity register (EIR). The GSM Phase 2+ enhancements to the GSM phase 1/2 CN are serving GPRS (General Packet Radio Service) support node (SGSN), gateway GPRS support node (GGSN) and CAMEL service environment. The most important new feature that is introduced with GPRS is packet switching (PS) which improves the capacity of the network. For UMTS, only minor modifications to the GSM Phase 2+ core network are needed. For instance, allocation of the transcoder (TC) function for speech compression.

The UTRAN architecture consists of several radio network subsystems (RNS). The RNS is further divided into the radio network controller (RNC) and several base stations (BTS, referred to as B nodes in the 3GPP specifications).

In this architecture there are several different connections between the network elements. The Iu interface connects CN to UTRAN. The Iur interface enables the exchange of signalling information between two RNCs. The signalling protocol across the Iur interface is called. radio network subsystem application part (RNSAP). The RNSAP is terminated at both ends of the Iur interface by an RNC. The Iub interface connects an RNC and a node B. The Iub interface allows the RNC and node B to negotiate about radio resources, for example, to add and delete cells controlled by node B to support communication of dedicated connection between UE and S-RNC, information used to control the broadcast and paging channels, and information to be transported on the broadcast and paging channels. One node B can serve one or multiple cells. UE is connected to node B through the Uu radio interface. UE further consists of a subscriber identity module (USIM) and mobile equipment (ME). They are connected by the Cu interface. Connections to external networks are made through Gateway MSC (towards circuit switched networks) or GGSN (towards packet switched networks).

FIG. 2 further presents current GERAN architecture. GERAN (GSM/EDGE radio access network) is an enhanced GSM radio access network. Enhanced here means that GERAN uses EDGE as a radio technology. EDGE allows use of UMTS services with 800/900/1800/1900 MHz frequency bands. GERAN offers full advantages of GPRS (General Packet Radio System) to be explored. The base station subsystem (BSS) of GERAN is connected to the GSM core network by Gb (between BSS and a GSM SGSN) and A (between a BSS and a GSM MSC) interfaces. BSS is further connected to UMTS network by interfaces Iu-ps (between a BSS and a 3G SGSN) and Iu-cs (between a BSS and a 3G MSC). BSS is further connected to the RNC of UTRAN or to another BSS by Iur-g interface. BSS includes a base station controller (BSC) and base transceiver stations (BTS). In GERAN the air interface between BTS and Mobile Station/user equipment (MS) is called Um. An IP-RAN (Internet Protocol Radio Access Network) is a RAN architecture that is fully optimised to carry IP traffic. In this configuration the division of functionalities between network elements is fundamentally redefined to suit the needs of IP traffic. This is clearly different from just using IP as a transport solution with the existing network architectures like GSM (Global System for Mobile Communications) and CDMA (Code Division Multiple Access) based radio access networks.

IP is currently the most 'future proof' technology offering unprecedented economies of scale, and the possibility to integrate right across the industry; fixed, wireless and mobile.

Future networks will contain multiple radio access technologies, such as GSM, BlueTooth, IEEE 802.11a/b, BRAN HL2 and WCDMA. The IP-RAN will provide a common base to tie all these technologies together in a single RAN. This will enable services to be used seamlessly across the RAN.

The benefits of IP, and IP enabled Radio Access Network (IP-RAN), can be seen clearly and they can be summarised as follows. The primary driver for the increased usage of IP is derived from operators' abilities to create new and easily customisable services over the de-facto service creation environment, the Internet. Secondly, as the content is expressed in the Internet Protocol, native support for IP makes networks more optimal for this form of traffic and operational, and capital expenditure savings over the whole network are significant. Thirdly, IP integrates various access and transport technologies and standards, including fixed, wireless and mobile, into common service creation and delivery networks.

In order to obtain the most efficient RAN architecture, which is based on using the good characteristics of IP, some functionality has to be relocated between network elements. In the most revolutionary architecture we no longer have a network element commonly known as a BSC (Base Station Controller) or RNC (Radio Network Controller), although this functionality must remain in the RAN. However, in evolutionary architectures, the RNC and BSC are still used.

Macrodiversity combining, or soft handover is a specific function of CDMA technology. As IP-RAN architecture will enable very large RAN GateWays, the location of the Macrodiversity Combiner can no longer be centralised for all BTSs (Base Transceiver Station) in RAN. Therefore, in one embodiment of the IP RAN there has been chosen to locate some RNC functionality in the BTSs to enable soft handover and associated signalling to happen along the shortest path, producing minimum delay and signalling load to those parts of networks where this is not necessary.

Referring to the above state of art description it can be said that IP RAN is realised by implementing most of the RNC (or BSC) functionality in the BTS (IP BTS). Only Paging, basic O&M (Operation and Maintenance) and configurations, Location Calculation functions and Common Radio Resource Management may be implemented in separate servers outside the BTS site.

In the distributed architecture of IP RAN the number of BSC/RNC that has to be connected to the neighbouring RAN and the core network CN is around hundreds times higher than in the normal case. The consequence is that the CN and RAN/BSS equipment cannot handle this situation, due to restrictions in the implementation of the configurations of neighbour RNC/BSC. For example the handling of the external addressing of the different entities and the use of the identifiers (in 3G networks an identifier is assigned to a UE that has an existing signalling connection to the radio access network) becomes very complicated.

Thus, there is an increasing need for a logical or virtual network entity that can handle the very complicated external addressing of the different network elements as well as the use of temporary identifiers assigned to the user equipment. Also there is an obvious need for a gateway type network element which can hide the distributed radio access network control element, i.e. the distributed functionalities of RNC/BSC from the CN's or neighbouring radio network's point of view.

SUMMARY OF THE INVENTION

Consequently, the present invention concerns a novel and improved method and system for implementing a signalling bearer connection between core network and/or radio access network of the neighbouring radio network and a base station or a number of base stations which substantially obviates one or more of the limitations and disadvantages of the related art.

One objective of the present invention is to provide a virtual radio access network access server (RNAS) which is able to operate as an interworking unit between the base stations and other radio access elements as well as core network. Specifically, unlike according to the present scenario of the radio access network in which the functionalities of RNC and BSC have been implemented in the separate elements thus increasing significantly the number of network elements that has to be logically connected to core network and/or to other radio access network, the present invention is designed to reduce the amount of said elements. This makes it easier to use and manage the distributed radio access network.

This is achieved by means of a method for implementing a signalling bearer connection in a distributed radio access network. In this context the distributed radio access network means the situation in which the radio access network is based on IP (Internet Protocol). This arrangement is achieved by implementing the functionalities of the radio control elements, e.g. RNC or BSC in the base stations. Logically this kind of structure can be seen as a partial radio access network (RAN) even if the certain functionalities, e.g. paging, basic O&M functions and configurations, location calculation and Common Radio Resource Management (CRRM) may have been preserved outside the base stations. In some embodiments it is possible to implement these functionalities in the base stations or even in the distinct servers that can be considered equal to the base stations in the light of addressing.

According to the invention, the method comprises the steps of creating a first interface instance between an interworking unit and a core network and/or a neighbouring radio access network, creating a second interface instance between said interworking unit and a set of base stations, and mapping the signalling traffic between said first and said second interface instances in said interworking unit. The purpose of this solution is to realise an interworking between the core network and the radio access control functions in the base stations as well as an interworking between the neighbouring radio control functions and the radio access control functions in the base stations.

According to one aspect, the invention relates to a system for implementing a distributed radio access network comprising a set of base stations, and at least one of the following networks: a core network, and a neighbouring radio access network. This network can be seen as an other radio resource network which is available for the user equipment. Further the connection between the set of base stations and the neighbouring radio network is needed e.g. in the relocating or handover processes between these two radio networks.

According to the invention the system further comprises an interworking unit for connecting said core network to said set of base stations and to at least one of said networks, said interworking unit comprising a first interface instance between said interworking unit and at least one of said networks, a second interface instance between said interworking unit and said set of base stations, and a mapping unit for mapping the signalling traffic between said first and said second interface instances. Thus a signalling bearer connection for user equipment can be created through said first and second interface instances.

According to another aspect, the invention relates to an interworking unit connected to a core network and/or a to neighbouring radio access network, and to a set of base stations in a distributed radio access network. According to the invention, the interworking unit comprises a first interface instance between said interworking unit and the core network or the neighbouring radio access network. The interworking unit further comprises a second interface instance between said interworking unit and a set base stations which have been equipped with radio access control. In addition to these interfaces, the interworking unit comprises a mapping unit for mapping the signalling traffic between said first and said second interface instances, whereupon said interworking unit functions as a logical radio network controller.

Thanks to the present invention the core network and the neighbouring radio access network, i.e. RNC/BSC see a set of IP BTS as one logical radio access network access server, RNAS. Further due to the invention RNAS is addressed and the signalling connection is terminated there and it hides the large amount of base stations, IP BTSs, from the external networks, and takes care of the necessary parameters and signalling translation. However, the invention still preserves the feature that the same signalling protocol that is used in the interfaces can be used also within IP RAN, i.e. in the interfaces between RNAS and IP BST's.

Further the invention provides an easy way to manage a distributed radio access network, i.e. the IP based radio access network, in which the functionalities of RNC and/or BSC is implemented in the base stations. Thus, thanks to the invention, to add a new base station, or node B as it is called in UMTS (Universal Mobile Telecommunication System) specifications, does not mean a plenty of configuration work nor problems in defining the addresses and updating the new network structure. Adding a new IP BTS does not require configuration changes in so many network elements than without using the invention.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
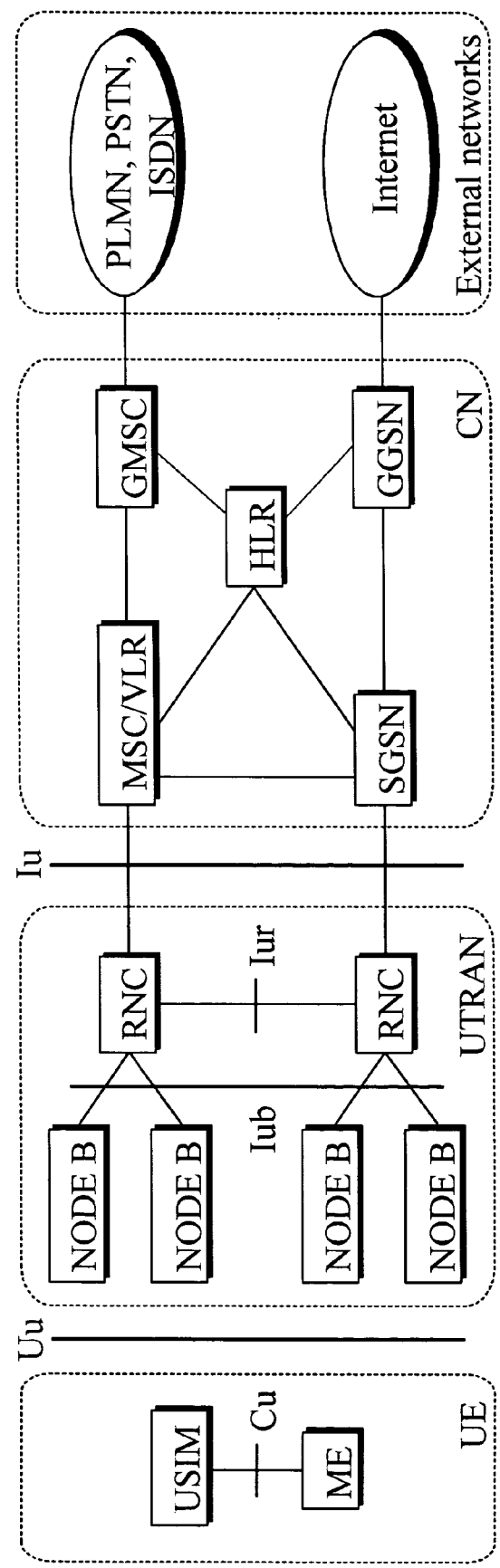
FIG. 1 is a block diagram illustrating an example of the state of the art scenario relating to the present mobile network.
Figure 2:
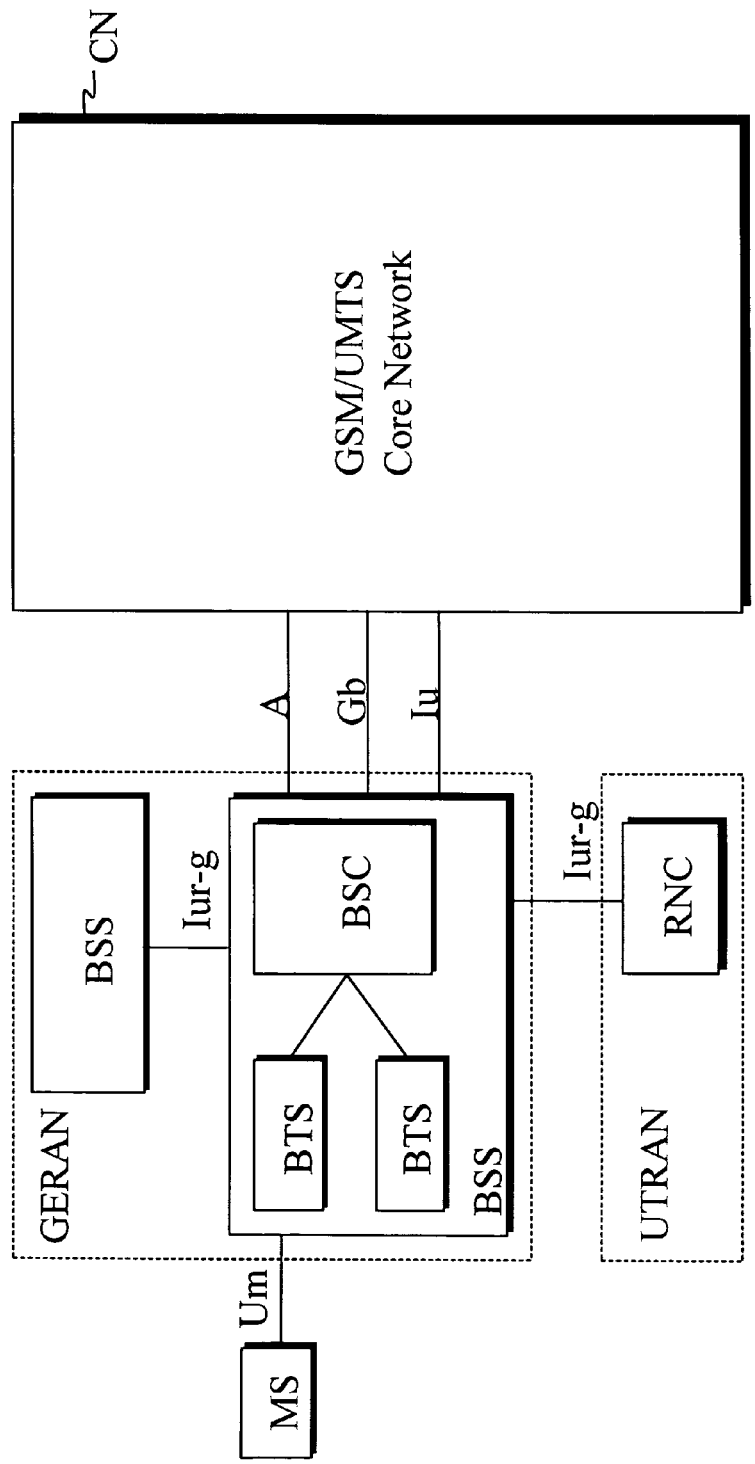
FIG. 2 is a block diagram illustrating an example of the state of the art scenario relating to the present mobile network.
Figure 3:
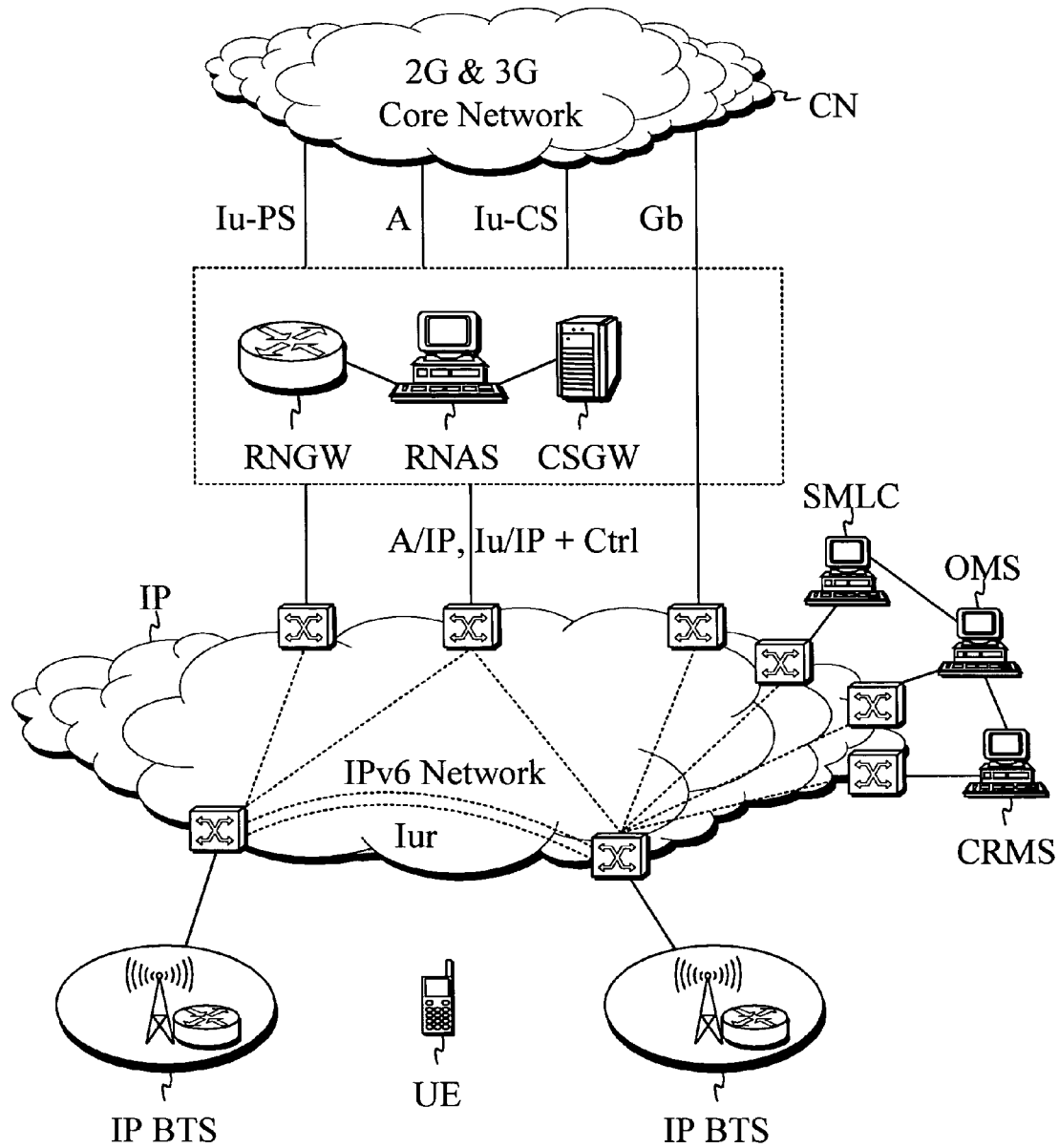
FIG. 3 is a block diagram describing an overall architecture of a distributed radio access network.

The IP RAN logical entities are next described by referring to FIG. 3. Each logical entity is described by listing the functions that it performs, and the relation with the other logical entity. Some of these functions are related only to the support of GSM/EDGE radio interface and some only to the support of UTRAN FDD (Frequency Division Duplex) radio interface.

CS (Circuit Switched) Gateway CSGW is a logical element used for the interworking of IP RAN towards A interface and ATM based Iu-CS interface. It is composed by two logical functions, i.e. Media Gateway MGW and A Server (ASE). MGW is used for the user plane interworking between A interface and Iu-CS to IP based part of the core network CN. MGW also performs the transcoding. A Server takes care of the adaptation of the BSSAP Rel '97 protocol to a BSSAP/IP protocol(Base Station Subsystem Application Part, BSSAP). Translation of the addresses is also required. The CSGW is controlled by the RNAS, and the CSGW acts as a micromobility anchor point for the A and Iu-CS interface and does not require for this function the RNGW. CSGW takes care of the control plane interworking [GSM], i.e. BSSAP to BSSAP/IP translation. RAN Gateway RNGW is the IP user plane access point from the core network CN to distributed radio access network IP RAN. During the Radio Access Bearer assignment procedure, RAN returns to the CN transport address(es) owned by the RNGW, where the user plane shall be terminated. In some embodiments, only Iu-PS interface is connected through the RNGW. The main function of the RNGW is the user plane switching during the network handover, in order to hide the mobility to the CN. Due to this function, there is no need to perform any radio network layer processing on the user data, but it relays data between the RAN and CN IP tunnels. RNGW has been connected to one or more RNAS, which selects a RNGW when there is a need to setup a RAB (Radio Access Bearer) for a user. It shall be possible for one RNAS to use more than one RNGW for the RAB of one UE.

The RAN Access Server RNAS acts as a signalling gateway between RAN and CN. It has the following functions. It discriminates the control plane messages of the Iu and A interfaces and relays them further. It also can have paging server functions, i.e. RNAS keeps track of the UE RRC (Radio Resource Control) status and location, processes the idle mode paging messages and other connectionless messages from the core network CN, and forwards them to the IP BTS controlling the cell the message is targeted to. RNAS is also a Micromobility control point, i.e. it selects and controls the gateways RNGW, CSGW, also during the relocation of the IP BTS.

In more detail, the RNAS has the following functions: RANAP (RAN Application Part) [GSM: and BSSAP] connection termination, setup and release of the signalling connections, discrimination of connectionless messages, processing of RANAP connectionless protocol messages; in User plane control: selection of the RNGW/CSGW unit, initialisation and control of the CSGW/RNGW entity for the UE connections, also during IP BTS relocation, Control plane anchor (function required only if UCF (UE Control Function) is not included in the RNAS), redirection of the signalling connection in case of UCF Relocation; in paging: Storing of information of the existing radio resource control (RRC) connection, Relaying of idle mode paging message to the relevant entities, Reset and overload control, Management of Reset and overload messages to/from the CN; and in RNGW/CSGW Management: Management of the logical resources of the RNGW/CSGW (addresses, etc.).

The functions of the O&M Server (OMS) are similar to the functions of the OMU (Operation and Maintenance Unit) in BSC and the NEMU in RNC. It is connected to every network element in IP RAN. Common Resource Management Server CRMS acts as a policy manager for the access to the cells and the radio bearer resources within IP RAN, by performing the Radio Resource Management algorithms. CRMS is also connected to other radio access network than IP RAN, allowing dynamic intersystem radio resource management (RRM). One CRMS collects information about the cell status in one area and, based on this, prioritises handover candidate lists, and modifies in OMS the RAN configuration parameters. Additionally, CRMS can access the configuration and performance monitoring databases in OMS.

The Serving Mobile Location Centre performs the MS (or UE) positioning functions in IP RAN. It controls Location Measurement Unit in the IP BTS and provides assistance data for UE based positioning to other network elements. In its operation, one SMLC may need to contact another SMLC, to retrieve some LMU measurement or assistance data. SMLC supports different positioning methods and associated positioning algorithms.

In the embodiment of FIG. 3, distributed radio access network IP RAN supports at least the following interfaces needed for interoperation with other radio access networks and core networks. Supported interfaces between distributed radio access network IP RAN and core network CN are the following. Iu-PS, 3GPP Rel 4, for the connection to the packet domain of the Core Network. All the services offered from the Iu-PS interface are supported. Iu-PS interface can be used with both GERAN and UTRAN/FDD radio interface; Iu-PS is specified by the 25.41x series of the 3GPP UMTS technical specification. Iu-CS, 3GPP Rel 4, for the connection to the circuit switched domain of the core network CN. All the services offered from the Iu-CS interface are supported. Iu-CS interface can be used with both GERAN and UTRAN/FDD radio interface. Iu-CS is specified by the 25.41x series of the 3GPP UMTS technical specification. Iu-CB (not shown in the figure), 3GPP Release 1999, for the connection to the Cell Broadcast domain of the core network. Iu-CB is specified by the 25.419, 3GPP UMTS technical specification. Gb, 3GPP Release 4 (Gb over IP), for the connection to the 2G SGSN. It is used by GERAN Radio interface. A, 3GPP Release 1999 (incl. GSM Rel '97), for the connection to the 2G MSC. It is used by GERAN radio interface.

As is mentioned above in IP RAN, most of the functions of the centralised radio network controller (RNC and BSC) are moved to the base station, IP BTS. In particular, all the radio protocols are moved to the base station. Entities outside the base station are needed to perform common configuration and RR (Radio Resource) functions, or interworking with other radio access networks, gateways to the CN, and micromobility anchor point. It must also be noted that these base stations IP BTS can support multiradio bearer selection, load sharing and the automation of network parameterisation for best possible air interface performance for GSM/EDGE, TDMA/EDGE, CDMA, WCDMA and WLAN based radio access networks. Iur-like interface Iur' is needed between base stations BS, supporting both control plane signalling and user plane traffic. Full connectivity among the entities is supported over the IPv6 transport network. It should be noted that most of these entities (SMLC, OMS, CRMS and/or RNAS) could be implemented also as one physical apparatus.

Figure 4:
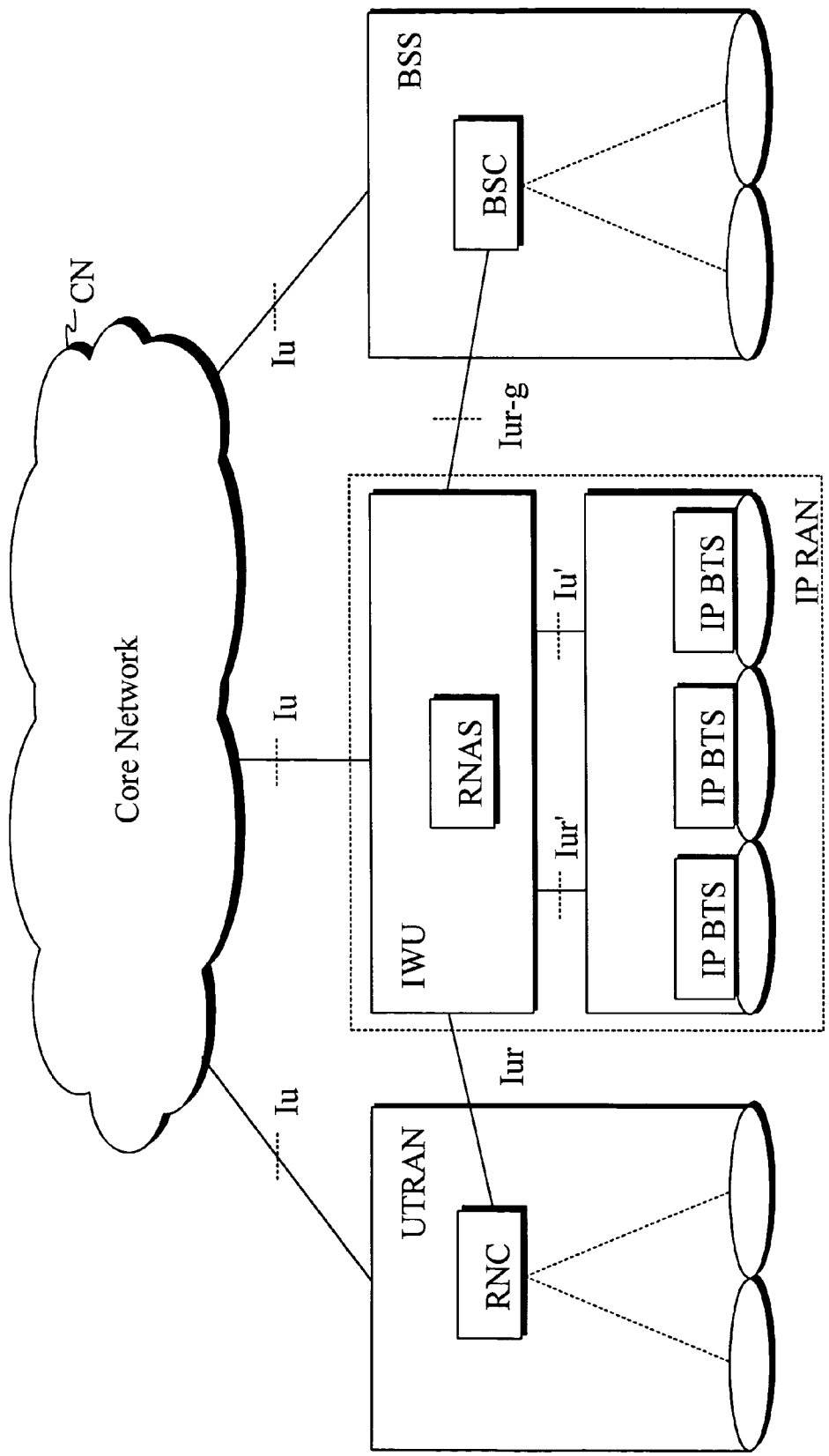
FIG. 4 is a block diagram of one embodiment of the present invention.

As shown in FIG. 4, the system according to one embodiment of the present invention comprises an interworking unit IWU in order to hide the distributed structure of the IP RAN from the core network and from the neighbouring RANs. The interworking unit IWU is connected with first interface instances Iu, Iur and Iur-g to the core network CN and to the RNC and BSC, correspondingly. Thus, the interworking unit IWU is 'seen' from the CN and other RANs as one BSC (for GSM) or RNC (for WCDMA), in terms of external addressing and identifiers. Further the interworking unit IWU is connected to the set of base transceiver stations IP BTS with the second interface instances Iu' and Iur'. In an advantageous embodiment of the invention, these second interface instances are implemented using IP protocol (IPv6 or IPv4).

The interworking unit IWU is herein intended as a signalling interworking unit for control plane processing and address translation. The interworking unit IWU can also be referred to as Radio Network Access Server RNAS. However, it should be noted that RNAS in IP RAN has more functions, as described above, than the signalling interworking. Thus, the signalling bearer connection for a user equipment UE, that has a connection with one of the IP BTSs, is created through said first and second interface instances Iu, Iur, Iur-g; Iu', Iur'.

Figure 7:
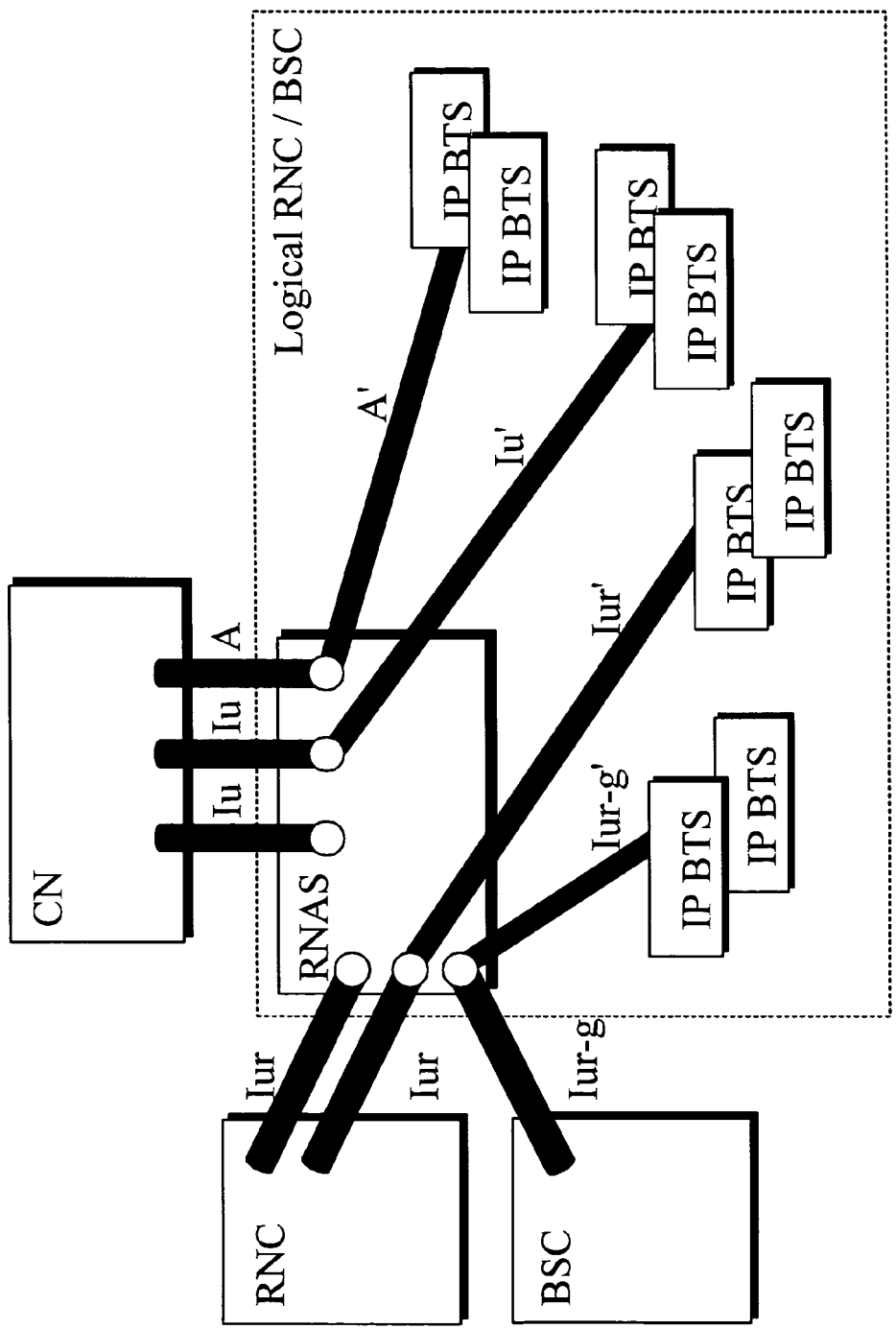
FIG. 7 describes the logical elements and connections in an embodiment of FIG. 4.

FIG. 7 shows one embodiment of the present invention in view of the logical element and connections. Referring to FIGS. 4 and 7, in a simple realisation of the present invention, RNAS preserves the nature of the Iu interface between the RNAS (or interworking unit IWU) and the core network CN, and Iur (or Iur-g) interface between the neighbouring radio networks. However, optimisation of the signalling may lead to changes in the interface from RNAS to IP BTS. Instance in this context means that signalling, e.g. Iu and Iur signalling terminates to the RNAS, that normally forwards transparently the messages, even though in some cases it performs necessary processing and parameter translation, and in certain cases also message translations. This means that in particular, for each UE two independent instances of the signalling bearer exists, one from CN/BSC/RNC to the RNAS, and the other from the RNAS to the IP BTS, and RNAS takes care of the mapping between these two. These signalling bearers have been described in FIG. 7 with thick lines. Consequently, CN and RNC/BSC sees a set of IP BTS as one logical RNAS.

Figure 5:
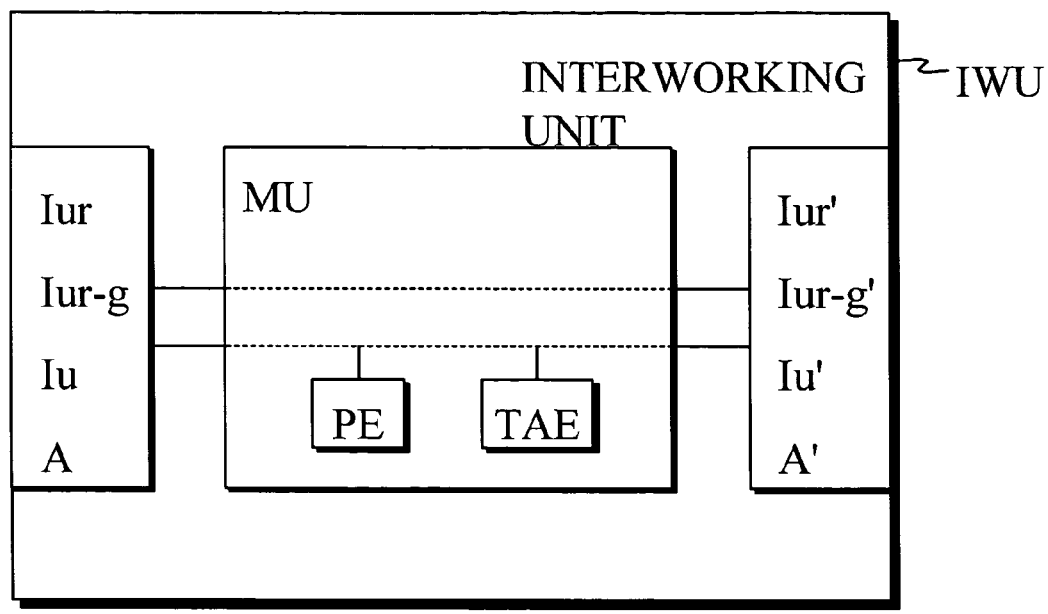
FIG. 5 is a block diagram of an interworking unit of FIG. 4.

FIG. 5 shows a block diagram of the interworking unit IWU according to one embodiment of the present invention. The interworking unit IWU is an essential element in the network structure of the present invention. The interworking unit IWU comprises two interfaces for the first and second interface instances Iu, Iur; Iu', Iur'. In this context an interface can be defined as a common boundary between parts of a system across which communication takes place. Further the interworking unit comprises the mapping unit MU that takes care of terminating signalling in the interworking unit. The mapping unit MU further consists of a transport address entity TAE which translates the transport addresses from the form used in said first interface instance Iu, Iur to the form used in said second interface instance Iu', Iur', and vice versa, and a protocol entity PE which translates the protocols of said first interface instance Iu, Iur to the protocols of said second interface instance Iu', Iur', and vice versa.

However, according to one embodiment of the present invention the same signalling protocol that is used between the core network CN and interworking unit IWU can be used also within IP RAN. This depends on the solution of the base transceiver stations IP BTS and can be configured case by case. Also the signalling traffic can be transmitted transparently through said interworking unit IWU between said first and second instances Iu, Iur; Iu', Iur'. In this case the mapping unit MU does not process messages or protocols.

Figure 6:
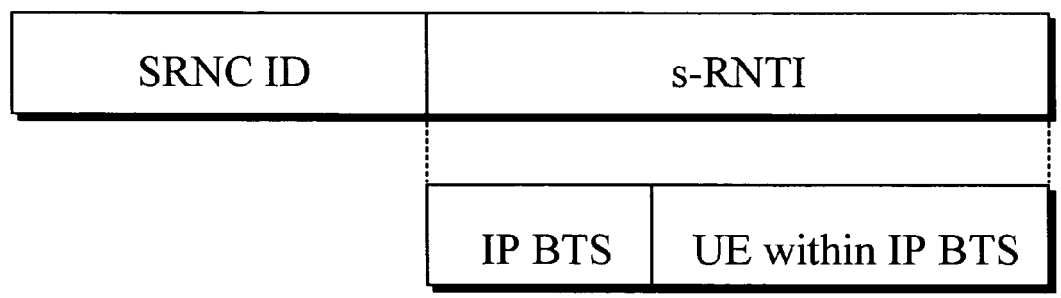
FIG. 6 describes the address structure according to one embodiment of the present invention.

In the following section, a detailed operational description of the interworking unit IWU is described with reference to FIGS. 5-7.

In the user plane setup, the request from the core network CN or neighbouring radio access network RAN to IP RAN, the message is terminated in the interworking unit IWU. The interworking unit performs a transport address translation. This is based on the fact that also in the user plane there are two logical tunnels, i.e. from CN/BSC/RNC to the gateway (RNGW/CSGW), and from the gateway to the IP BTS. The gateway is controlled by the RNAS (as described above) and it terminates the user plane. In the case of Iur interworking, i.e. in the interface between interworking unit IWU and the neighbouring radio access network, it should also be possible to have direct user plane to the IP BTS.

The messages (Paging, O&M messages) that are not transported in the user equipment UE specific connection signalling may require processing and particular actions in the RNAS. However, this is not in context of the present invention and is not described in more detail.

Certain procedures, i.e. RANAP (RAN Application Part) SRNC (Serving RNC) Relocation and/or BSSAP (Base Station Subsystem Application part) handover can still be used in the external interface between the radio access network access server RNAS and the core network CN to change the RNAS used for a connection (and consequently the IP BTS), but they can also be used only between the RNAS and the IP BTS to relocate or handover the IP BTS. This is not visible to the core network CN. In an amendment to this, the IP BTS can initiate the relocation or handover procedure, and RNAS decides whether to relocate only the IP BTS, or to involve the core network CN to have a RNAS relocation. As mentioned below, also for the relocation an optimisation could lead to the need to design a new method for the RNAS-IP BTS relocation, different from the RANAP or BSSAP relocation. In 3G networks, the identifiers are assigned to a user equipment UE that has an existing signalling connection to the radio access network (Radio Resource Control (RRC) connection). The identifiers (u-RNTI (UTRAN Radio Network Temporary identifier) and G-RNTI (GERAN Radio Network Temporary identifier)) are composed by two parts: SRNC ID, that identifies the network elements that terminate the RRC connection in UTRAN side, that has stored the Radio Resource context of the UE, and that terminates the signalling connection to the core network CN. This is RNC (WCDMA) or a BSC (GERAN), and s-RNTI that identifies the UE within the cell of node B handled by the RNC/BSC.

In the distributed radio access system according to the present invention each IP BTS assigns RNTIs with following format (FIG. 6): the SRNC ID part of the RNTI identifies the RNAS (IWU or logical RNC/BSC from the core network's CN point of view) associated with the IP BTS where the UE RR context is stored, first nn bits of the s-RNTI identify the base station IP BTS in the RNAS's logical area (in other words, the IP BTS is identified by the SRNC ID+first nn bits of the sRNTI), and last bits of the s-RNTI identify the user equipment UE within the base station IP BTS. This use of RNTI is compliant with the core network CN, but it also allows addressing within IP RAN.

It is also possible that some messages, relating to certain procedures, are tunnelled transparently without being decoded in the RNAS. In particular, the messages sent once the signalling connection has been created for one UE (connection-oriented messages) can be tunnelled without the need to be read in the RNAS or in the interworking unit IWU, while only the message sent to establish the signalling connection, or all the messages sent without a signalling connection have to be decoded.

In this application, the neighbouring radio access network can be any other radio access network and can be implemented using whatever access techniques although the examples presented are concerning the UMTS and GSM access networks. The first interface instances Iu, Iur, Iur-g, A, Iu-PS, Iu-CS and Gb presented in the description of the invention may be also some other than presented. The connections from the RNAS to the core network and other access networks may be implemented for example by asynchronous transfer mode (ATM) or IP protocols. Generally these interfaces may be circuit or packet switched. If the core network CN is using Internet protocol for transmission, it is useful to have the same protocol throughout the whole network and on the first interface instance also.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A method, comprising:
creating a first interface instance between an interworking unit and at least one of the networks selected from a group of networks comprising a core network and a neighbouring radio access network, wherein the method implements a signaling bearer connection in a distributed radio access network;
creating a second interface instance between said interworking unit and a set of internet protocol base stations;
assigning temporary identifier information to user equipment that has a connection to an internet protocol base station of said set of internet protocol base stations; and
mapping of the signalling traffic between said first and said second interface instances in said interworking unit, said mapping assigning signalling traffic from said first interface instance to said second interface instance based on said temporary identifier information.

2. The method according to claim 1, further comprising:
creating a signalling bearer connection for a user equipment through said first and second instances.

3. The method according to claim 1, wherein the mapping of the signalling traffic comprises translating a transport address from the form used in said first interface instance to the form used in said second interface instance.

4. The method according to claim 1, wherein the mapping of the signalling traffic comprises translating a transport address from the form used in said second interface instance to the form used in said first interface instance.

5. The method according to claim 1, wherein the mapping of the signalling traffic comprises translating a signalling protocol of said first interface instance to a signalling protocol of said second interface instance.

6. The method according to claim 1, wherein the mapping of the signalling traffic comprises translating a signalling protocol of said second interface instance to a signalling protocol of said first interface instance.

7. The method according to claim 1, wherein the mapping of the signalling traffic comprises transmitting said signalling traffic transparently through said interworking unit between said first and second instances.

8. The method according to claim 1, further comprising:
composing said identifier information in a three-part form wherein the first part identifies said interworking unit, the second part identifies said internet protocol base station and the third part identifies said user equipment.

9. The method according to claim 1, further comprising:
assigning a unique address to said interworking unit; and
addressing said set of internet protocol base stations, which has been connected to said interworking unit with said unique address.

10. The method according to claim 1, further comprising:
controlling user plane traffic by said interworking unit.

11. A system, comprising:
a set of internet protocol base stations;
at least one of a core network and a neighbouring radio access network; and
an interworking unit configured to connect said core network to said set of internet protocol base stations and to at least one of said networks, said interworking unit comprising
a first interface instance between said interworking unit and at least one of said networks,
a second interface instance between said interworking unit and said set of internet protocol base stations, and
a mapper configured to map the signalling traffic between said first and said second interface instances, said mapper assigning signalling traffic from said first interface instance to said second interface instance based on temporary identifier information associated with a user equipment.

12. The system according to claim 11, wherein said interworking unit is implemented in a radio access network server.

13. The system according to claim 12, wherein the radio access network server controls the functions of radio access network gateway and circuit switched gateway.

14. The system according to claim 11, wherein said interworking unit is connected to said set of internet protocol base stations, and said set of internet protocol base stations is addressed as one logical interworking unit.

15. The system according to claim 14, wherein said interworking unit is assigned a unique network address for addressing said set of base stations and that the signalling connection is terminated in said interworking unit.

16. The system according to claim 11, further comprising:
a transport address entity configured to translate the transport addresses from the form used in said first interface instance to the form used in said second interface instance, and vice versa.

17. The system according to claim 11, further comprising:
a protocol entity configured to translate the protocols of said first interface instance to the protocols of said second interface instance, and vice versa.

18. The system according to claim 11, wherein said internet protocol base station is equipped with radio access control equipment.

19. An apparatus, comprising:
- a first interface instance, wherein the apparatus is connected to at least one of a core network and a neighboring radio access network and to a set of internet protocol base stations in a distributed radio access network;
- a second interface instance between said apparatus and a set of internet protocol base stations which has been equipped with radio access control equipment; and
- a mapper configured to map the signalling traffic between said first and said second interface instances, said mapping assigning signalling traffic from said first interface instance to said second interface instance based on temporary identifier information associated with a user equipment, wherein said apparatus is configured to function as a logical radio network controller.

20. The apparatus according to claim 19, wherein the first interface instance is created between said apparatus and said core network.

21. The apparatus according to claim 19, wherein the first interface instance is created between said apparatus and a neighbouring radio network controller.

22. The apparatus according to claim 19, wherein the first interface instance is created between said apparatus and a neighbouring base station controller.

23. The apparatus according to claim 19, wherein the second interface instance is created between said apparatus and a set of internet protocol base stations.

24. The apparatus according to claim 19, wherein said first and second interface instances are terminated in said apparatus.

25. The apparatus according to claim 19, comprising:
- a transport address translator configured to translate the transport addresses from the form used in said first interface instance to the form used in said second interface instance, and vice versa.

26. The apparatus according to claim 19, further comprising:
- a protocol entity configured to translate the protocols of said first interface instance to the protocols of said second interface instance, and vice versa.

* * * * *